(12) United States Patent
Evans et al.

(10) Patent No.: US 6,676,233 B1
(45) Date of Patent: Jan. 13, 2004

(54) STORAGE LIFT

(76) Inventors: Paul E. Evans, 5305 Frost Point Cir. SE., Prior Lake, MN (US) 55372; John S. Titus, 5331 Frost Point Cir. SE., Prior Lake, MN (US) 55372

( * ) Notice: Subject to any disclaimer, the term of this patent is extended or adjusted under 35 U.S.C. 154(b) by 0 days.

(21) Appl. No.: 09/942,501

(22) Filed: Aug. 29, 2001

(51) Int. Cl.[7] .................. B66B 9/00; B66B 11/02; B66B 11/04

(52) U.S. Cl. .................. 312/247; 52/29; 182/141; 187/239; 187/401; 187/409; 211/1.57; 108/147.11

(58) Field of Search .................. 52/30, 36.4, 169.6, 52/79.1, 79.5, 245, 29; 187/263, 254, 256, 266, 213, 239, 401, 408, 409; 312/247, 249.1; 182/141; 211/1.57; 108/144.11, 147.11; 414/592

(56) References Cited

U.S. PATENT DOCUMENTS

| | | | |
|---|---|---|---|
| 464,900 A | * 12/1891 | Schwannecke | |
| 496,997 A | * 5/1893 | Chisholm | |
| 504,576 A | * 9/1893 | Gregory | |
| 749,653 A | 1/1904 | Arnold | |
| 803,274 A | 10/1905 | Deaver | |
| 819,419 A | * 5/1906 | Franklin | |
| 1,392,660 A | * 10/1921 | Sebestakowicz | |
| 1,442,579 A | 1/1923 | McArthur | |
| 2,490,652 A | * 12/1949 | Sahlin | |
| 2,499,791 A | 3/1950 | Spencer | |
| 2,634,186 A | * 4/1953 | Zuss | |
| 3,729,245 A | 4/1973 | Skifstrom | |
| 3,887,038 A | * 6/1975 | Buschbom et al. | |
| 3,945,469 A | * 3/1976 | Dorcich | |
| 3,961,711 A | 6/1976 | Perks | |
| 4,184,570 A | * 1/1980 | Edwards | |
| 4,239,440 A | * 12/1980 | James | 414/540 |
| 4,469,198 A | * 9/1984 | Crump | 169/48 |
| 4,591,308 A | * 5/1986 | Imai | |
| 4,653,707 A | * 3/1987 | Hamilton et al. | 187/264 |
| 4,804,307 A | * 2/1989 | Motoda | 414/232 |
| 4,865,155 A | * 9/1989 | Montaigne et al. | 182/14 |
| 4,971,506 A | * 11/1990 | Givati | 414/228 |
| 5,078,415 A | * 1/1992 | Goral | 108/55.1 |
| 5,143,182 A | * 9/1992 | Basta | 114/44 |
| 5,199,843 A | 4/1993 | Sferra | |
| 5,203,619 A | * 4/1993 | Welsch et al. | 312/242 |
| 5,224,677 A | 7/1993 | Close | |
| 5,251,709 A | * 10/1993 | Richardson | 175/162 |
| 5,320,121 A | * 6/1994 | Alexanian | 134/123 |
| 5,372,072 A | * 12/1994 | Hamy | 104/119 |
| 5,507,237 A | * 4/1996 | Barrow et al. | 108/53.1 |
| 5,871,070 A | * 2/1999 | Contreras | 187/263 |
| 5,901,862 A | * 5/1999 | Riga et al. | 211/85.16 |

(List continued on next page.)

FOREIGN PATENT DOCUMENTS

| | | | |
|---|---|---|---|
| EP | 0 402 283 | * | 12/1990 |
| JP | 6-46926 | * | 2/1994 |

Primary Examiner—Robert Canfield
(74) Attorney, Agent, or Firm—Albert W. Watkins

(57) ABSTRACT

A storage lift includes two vertically extending tracks mounted to a wall surface such as a garage wall. The tracks guide associated sliding members through vertical motion up and down adjacent the wall. The sliding members are in turn hinged to a platform that serves in alternative embodiments as a storage platform base or a variable-height work surface, and which may also be folded compactly when not in use or during shipping. A full box framework is provided for most applications, and panels are slidable within framework grooves or brackets to fully enclose the platform. A cover may optionally be provided as required. In the preferred embodiment, an electric motor is provided within the storage platform base for motive power, and a key switch control is provided to safely actuate the motor. The electric motor in the preferred embodiment is attached to the tracks through a combination of cables and pulleys, though other techniques are contemplated.

19 Claims, 3 Drawing Sheets

U.S. PATENT DOCUMENTS

| | | | | |
|---|---|---|---|---|
| 5,964,159 A | * | 10/1999 | Hein | 104/128 |
| 6,010,093 A | * | 1/2000 | Paulson | 244/24 |
| 6,105,793 A | * | 8/2000 | Riga | 211/85.16 |
| 6,161,702 A | * | 12/2000 | Campbell | 211/1.57 |
| 6,241,048 B1 | * | 6/2001 | Heilmann | 108/106 |
| 6,247,273 B1 | * | 6/2001 | Nickel | 182/230 |
| 6,260,489 B1 | * | 7/2001 | Weaver et al. | 108/152 |
| 6,305,501 B1 | * | 10/2001 | Kahkipuro et al. | 187/250 |
| 6,471,311 B1 | * | 10/2002 | Snyder | |

* cited by examiner

STORAGE LIFT

BACKGROUND OF THE INVENTION

1. Field of the Invention

This invention pertains generally to supports and cabinets. More particularly, the invention pertains to a wall or surface mounted vertically movable housing or compartment. In a most preferred embodiment, the invention pertains to garage storage systems that enable limited space within a garage or the like to be used optimally for storage, working surfaces, or vehicles as required at any particular time.

2. Description of the Related Art

In the design and construction of a dwelling, there are many competing factors that must be addressed. Among these are a person's desire for adequate space to carry on normal daily activities and ability to gain ready access to items required during those regular activities. In addition, sufficient storage area or shelter must be provided for less frequently used items and expensive or valuable equipment. When there is insufficient space, a great deal of time may be lost, and frustration will build, adversely affecting the person's comfort and quality of life. However, limiting a person's ability to attain these desirable features of a dwelling are the limited land space available for the population in general, the greater expense of larger structures, and also the increased time and expense required to maintain larger dwellings.

Consequently, various artisans have worked to design more efficient ways to store various items in a smaller occupied space. U.S. Pat. No. 5,199,843 to Sferra is illustrative. The Sferra patent illustrates above-vehicle storage using an elaborate lift and conveyor system that runs the length of a garage area. This system allows persons to use available dwelling space more efficiently. Unfortunately, the Sferra system places several undesirable constraints upon the design and construction of the garage. More particularly, the Sferra system requires the garage to be open for the entire length above the vehicle, and have enough space in that area for reasonable storage.

Unfortunately, most home garages have little available space above the vehicle. This is due to the aforementioned limiting factor of expense, and also aesthetics of the garage in proportion to the dwelling. Most garages are provided with an overhead door that opens only slightly above the roof of a typical vehicle, and when open extends over the top of such a vehicle parked within the garage. In most instances, the overhead door will also be adjacent a ceiling or the beginning of a roof structure within the garage when in this open position. In other words, there is either no available space above the vehicle and garage door, or extremely limited space. Such limited space normally does not provide sufficient justification for the complex and costly system of storage Sferra illustrates. As a result, the Sferra system is limited in application to only those situations where a pre-existing structure has unusually high ceilings within which to provide storage.

U.S. Pat. No. 3,729,245 to Skifstrom illustrates an electrically driven cabinet structure designed to work above a kitchen counter. While the Skifstrom system offers better access to higher items within a cabinet, very little is gained in efficiency of storage in applications beyond a kitchen cabinet. U.S. Pat. No. 5,871,070 to Contreras illustrates a wall mounted storage lift referenced for use within a garage, but uses a cable system that would be inherently extremely dangerous for elevating larger or heavy objects, since the failure of a single cable would easily spill the platform. Furthermore, the cables allow movement and shifting of the platform that, even absent a mechanical failure, could still lead to an accident. Consequently, there is still a need for more efficient storage and use of space within dwelling structures and particularly within garages and work areas.

SUMMARY OF THE INVENTION

In a first manifestation, the invention is a storage lift apparatus supported entirely on a single surface of a generally planar wall. The lift includes a cargo support base; a support track secured to the wall; a runner supporting the cargo support base retained within the support track and moveable between a position adjacent the floor and a position adjacent the ceiling; and a drive operatively connected to move the runner relative to support track and thereby operatively move the cargo support base relative to the floor. The storage lift apparatus may be loaded with cargo at a floor level position and subsequently elevated therefrom by the drive moving the runner relative to the support track, to make the floor level space available for alternative usage.

In a second manifestation, the invention is a multi-purpose transportation, work and storage unit within which a motor vehicle is parked and stored and which selectively provides an adjustable height working surface or additional storage space. A garage structure receives and shelters the motor vehicle and has a floor, a roof, and a wall. A lift has first and second vertically extending guides affixed to the wall, runners journalled and slidable within the guides, an object supporting surface extending perpendicular from and solely supported by the runners, a drive for vertically displacing the lift from floor, and a means to adjust the height between object supporting surface and floor. Cargo may then be alternatively supported adjacent floor level, above floor and within reach of a person for work or above storage, or above a motor vehicle without ground-level impediment.

In a third manifestation, the invention is a surface-mounted adjustable height wall unit operative for raising a load from a floor to a second position spaced therefrom and subsequently lowering the load back to the floor. The wall unit includes a wall mount for rigidly attaching to a wall surface. A base supports the load by defining a horizontal surface. A back is movably attached to the wall mount. The base is pivotally attached to the back along a back edge of the base and rotates between horizontal and vertical. A drive moves the back and base relative to wall mount, and a removable frame forms a basket with back and base into which the load may be placed and retained. At least one panel is removably attached to the frame adjacent base front edge and horizontal surface sides, thereby forming a barrier to human tampering with a raised load.

OBJECTS OF THE INVENTION

A first object of the invention is to provide a more efficient use of space within a garage or other work area than is currently practiced. A second object of the invention is to provide a device that may be installed easily into an existing structure. A third object of the invention is the provision of an apparatus that may be operated safely. A further object of the invention is the provision of an apparatus that may serve several diverse purposes, enabling not only storage, but also expanding the ways a particular work space may be used to include temporary, adjustable height surface and work benches. Another object of the invention is the ability to manufacture the storage apparatus for reasonable costs, thereby making the apparatus available for as wide a range of applications as possible. These and other objectives are achieved in the present invention, which will be best understood from the description of the preferred embodiment in association with the accompanying drawing figures.

DESCRIPTION OF THE PREFERRED EMBODIMENT

Figure 1:
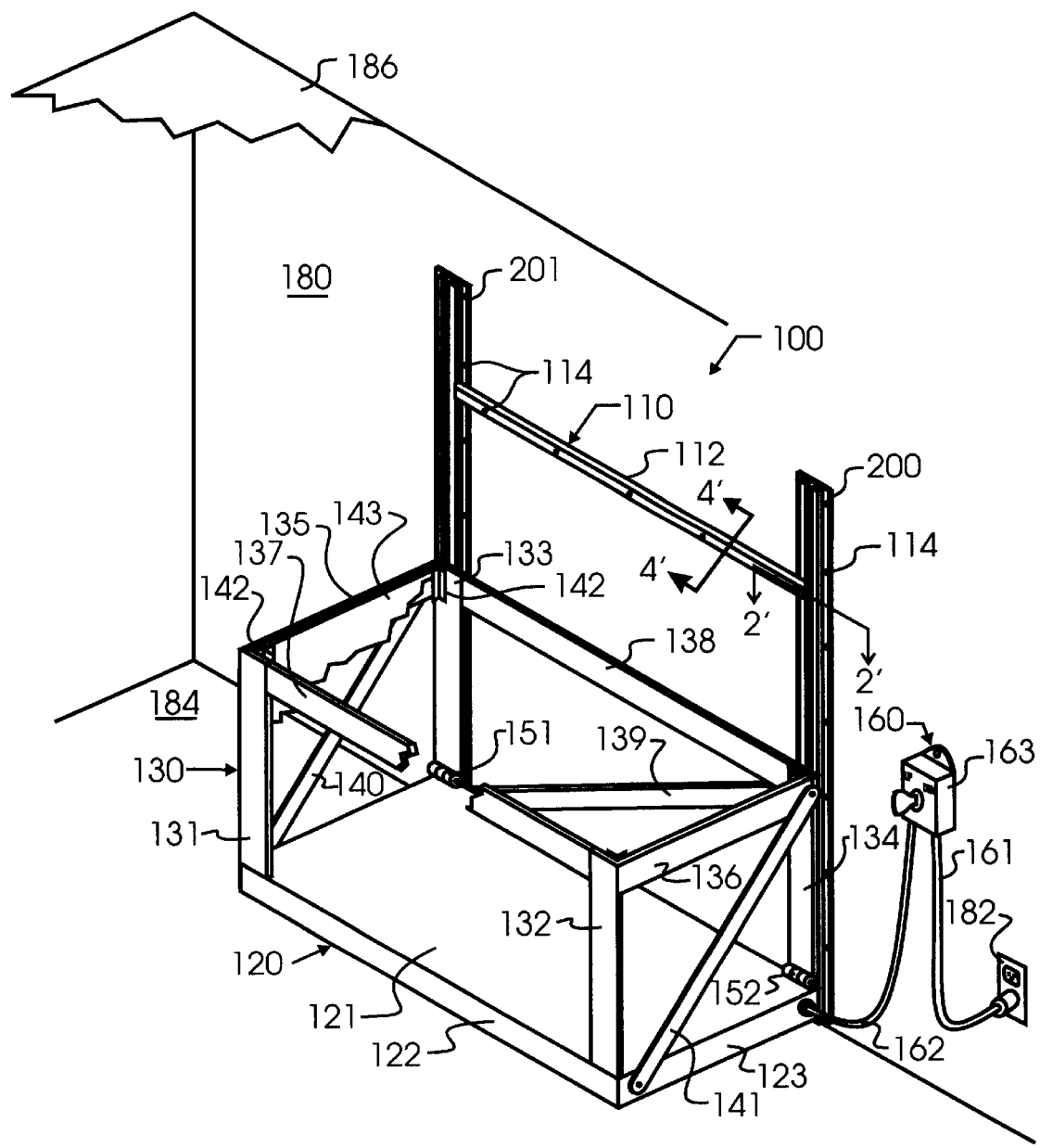
FIG. 1 illustrates a preferred embodiment storage lift from projected view.

Storage lift 100 is most preferably mounted to a wall 180 which might typically be the end wall within a common garage opposite the garage door. While described mounted against this common garage wall, artisans will at once recognize that the preferred embodiment has much broader utility, and will provide much benefit in other applications. The applications for the preferred embodiment and alternatives extend well beyond garages, and may include various rooms, storage areas, outbuildings, warehouses, retail outlets, and many other buildings and static structures too numerous to mention herein.

Wall 180 will typically include an electrical outlet 182, and is adjacent and perpendicular to floor 184 and ceiling 186. Wall mount 110 in the most preferred embodiment includes one or any plurality of vertically extending tracks 200, 201. In the most preferred embodiment, two are illustrated, which provides convenient mounting and distribution of forces across wall 180. In this embodiment, tracks 200, 201 will extend vertically most preferably in alignment with structural members such as wall studs or the like which may typically be found and to which large loads may be anchored. Tracks 200, 201 may also have various holes 114 therein, through which fasteners 115 such as screws, nails, bolts or the like may pass for rigid attachment to wall 180. Other fastening techniques may also be used, as known in the art.

Tracks 200, 201 are most preferably fabricated through an extrusion process, and may be of an aluminum alloy or the like. The extrusion process enables high volume, low cost manufacture with special advantageous features described herein below, while avoiding major tooling expense. Aluminum offers the added benefit of exceptional appearance, lower package weight, high strength, and excellent long term resistance to corrosion. Noteworthy here is the fact that safety may be compromised over time should the wall mount be subject to corrosion, and so the mount will most preferably be manufactured from materials that offer excellent resistance thereto. Nevertheless, other materials and manufacturing processes are contemplated. Stainless steel, galvanized steel, vinyl coated steel, structural composites and other known equivalents will be considered by those of skill in the art and may be applicable for particular applications, as are other manufacturing processes such as stamping and molding.

Spacing tracks 200, 201 by an exact amount is at least one cross member 112. Cross member 112 will most preferably be height adjustable, and will have anchoring holes 114 that are also spaced to align with wall studs. Consequently, cross member 112 will not only accurately space tracks 200, 201, but will also provide structural strength and integrity to the entire structure comprising wall mount 110. A plurality of cross members 112 may be provided, or a single larger sheet or solid spacer may be provided. Nevertheless, in the preferred embodiment, either one or two cross members are believed to be adequate for most installations.

Figure 2:
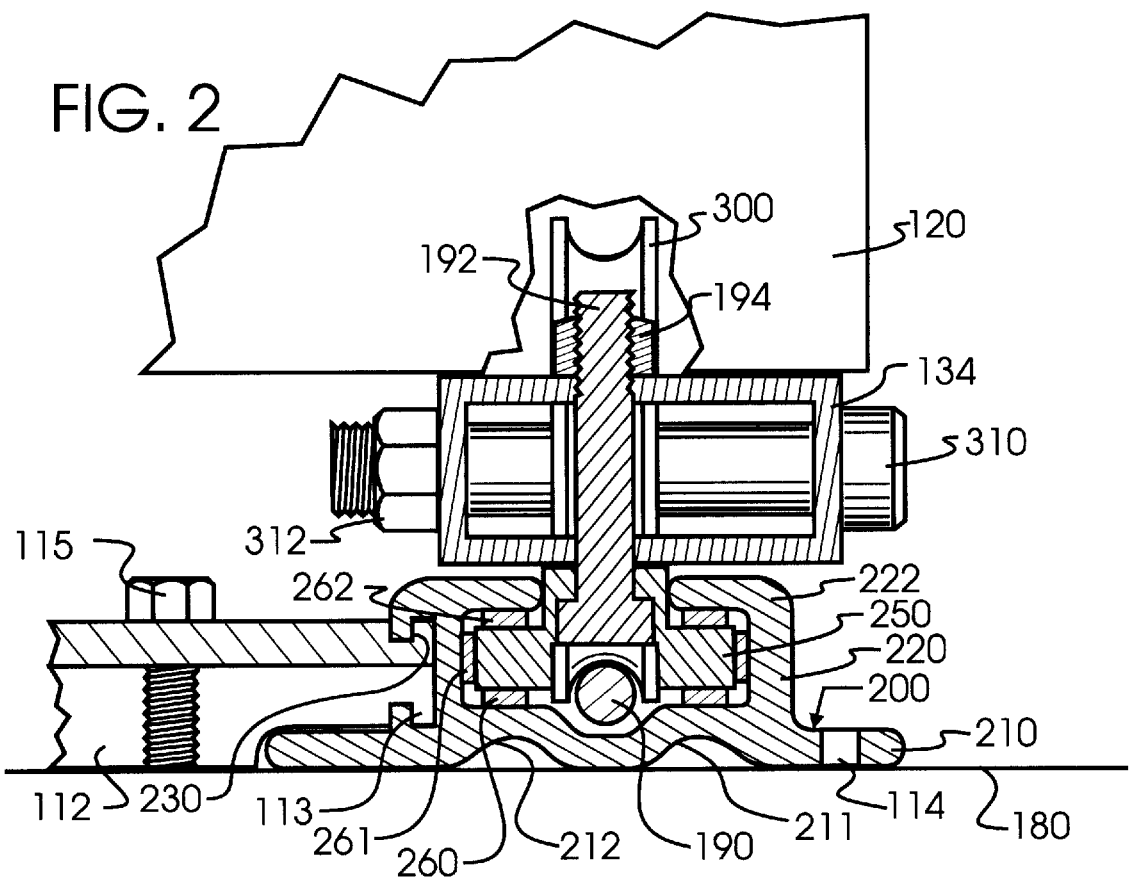
FIG. 2 illustrates a preferred embodiment track, runner and cross member combination used in the storage lift of FIG. 1 by enlarged cross-sectional view taken along line 2' of FIG. 1, with platform 120 elevated from the position of FIG. 1.

Mounted for sliding adjacent tracks 200, 201, through means described herein below with reference to FIG. 2, are several frame members 133, 134, 138, 139 that comprise a back portion of load or cargo supporting platform 120. In particular, frame members 133, 134 will most preferably extend longitudinally parallel to tracks 200, 201, generally in a vertical direction. A pair of hinges 151, 152 are provided at the lower end of frame members 133, 134 which pivotally and securely fasten platform base 121 including front edge 122 and side 123 thereto. Hinges 151, 152 permit platform base 121 to be folded parallel to frame members 133, 134 during periods of non-use, particularly during shipping and when seasonal equipment that would otherwise be supported upon platform 120 is in use and so is not supported upon platform 120. In an alternative embodiment, hinges 151, 152 may be replaced by bolts or the like, at the expense of being able to fold platform 120 parallel to frame members 133, 134. Further support between platform base 121 and frame members 133, 134 is provided through diagonal framing members 140, 141. Most preferably, these diagonal framing members will also be removable to allow the pivoting of platform base 121.

A cargo support frame 130 is optionally provided, and consists of corner vertical posts 131, 132 and top frame members 135–137 which, in association with frame members 138–141, form a box above platform base 121. Most preferably, support frame 130 will be further augmented with one small corner braces at each corner, for a total of four braces, such as the corner brace 142 illustrated. These braces may be substituted with other devices or means for retaining vertically extending panels, such as panel 143 shown by partial cut-away view in FIG. 1, to enable cargo support frame 130 to completely enclose cargo placed upon platform 120. The use of support frame 130 and various braces such as brace 142 and various panels such as panel 143 enables panel 143 to be dropped into place from a vertical direction only. The added benefit of this requirement is that panels 143 may be removed only when platform 120 is adjacent floor 184. Consequently, any cargo loaded upon platform 120 is secured by key lock when in the elevated position adjacent ceiling 186, since panels 143 block access to cargo and panels 143 may not be removed vertically.

Motion of platform 120 relative to wall mount 110 is controlled through a key switch control 160 having a power cord 161 plugged into outlet 182, enabled or disabled by key switch 163, and when enabled, conducted to platform 120 through cord 162. The preferred embodiment storage lift 100 uses an electric motor, illustrated in FIG. 5, to drive platform 120 relative to floor 184, as described herein below. By placing a key switch along wall 180 horizontally displaced from platform 120, an operator will be forced to more safely operate storage lift 100, since operation requires the operator to stand adjacent key switch 163 and therefore be out from underneath platform 120. This therefore provides additional safety during use. Further safety may be provided within control 160 to cut off power in response to particular situations that may be encountered, such as travel distance limiting switches or overload switches, and also hazard sensors such as optical or ultrasonic obstacle detectors. Further techniques including electric braking and the like are considered. These types of safety systems are well known in the garage door and elevator industries, and techniques used in those industries as well as the storage industry are contemplated herein.

FIG. 2 illustrates the relationship between frame member 134 and track 200 in enlarged cross section for illustrative purposes. Note that this view is taken with platform 120 and frame member 134 elevated to adjacency with frame member 200. Most preferably, frame member 200 includes a base 210 adjacent wall 180 through which holes 114 pass, to allow fasteners such as lag screws 115 to pass. Within base 210 two vertically extending ridges 211, 212 will most preferably be provided, which serve as a bearing surface upon which shoe 250 may ride. Extending normal from base 210 and wall 180 are side walls 220 and flanges 222. The combination of base 210, side walls 220 and flanges 222 form a vertically extending track within which one or more shoes such as shoe 250 may pass. Most preferably, shoe 250 will be shaped to fit therein, and will most preferably have some type of low friction liner, surface or material for engaging with track 200. In the most preferred embodiment, shoe 250, which may be fabricated from extruded aluminum also, is provided with polymeric vertically extending strips such as strips 260–262 illustrated in FIG. 2. In a contemplated alternative, a single strip or even coating of low friction material may be provided. Strips 260–262 are preferably fabricated from Rulon™, though other materials including various nylon, polypropylene, high density polyethylene, ultra-high molecular weight polyethylene and polypropylene, and polytetrafluoroethylene (Teflon™) type compounds, along with any other similar low friction polymers, lubricants, and coatings, whether in strip form, deposited as thin coatings, or otherwise provided, are contemplated herein. Most preferably, this material will prevent adverse interaction between the materials of shoe 250 and track 200 during relative motion there between, even when under extremely high weight loading.

As is also visible in FIG. 2, cross member 112 may readily be fastened track 200 through a small shoulder 113 formed at the ends of member 112 that will slide into a mating vertically extending slot 230 formed in track 200. Using this technique for interconnection allows cross member 112 to be positioned at any vertical position while providing a fixed horizontal spacing between tracks 200, 201. For example, in the preferred embodiment, cross member 112 may be fabricated to space track 200 from track 201 by an on-center measurement of exactly eight feet, which will allow tracks 200, 201 to be mounted to wall studs which are commonly spaced at either sixteen or twenty four inches, either which will align with an eight foot spacing. As should be apparent, this interconnection of cross member 112 with tracks 200, 201 provides additional anchoring to wall 180, thereby boosting the safety and load capacity of wall mount 110.

Shoe 250 is most preferably only a few inches in vertical length when located within tracks 200, 201. The limit of length is determined by the pull-out strength of flanges 222, and the longer shoe 250 is, the greater forces will have to be to pull shoe 250 out through flanges 222. However, the shorter vertical length for shoe 250 allows shoe 250 to better follow irregularities in surface geometry and installation direction, since at an extremely short length, shoe 250 will act like a point location of attachment only, and in this extreme would easily follow any irregularity in track 250 or wall 180. Nevertheless, some length is necessary for pull-out strength, and this must be balanced against the desired shorter lengths for better tracking of shoe 250 within tracks 200, 201 by a designer of storage lifts in accord with the present invention. The use of a single bolt 192 and a locking nut 194 such as the Keps™ or Nylok™ brand locking nuts, cap nuts or other suitable equivalents allows shoe 250 to pivot about an axis of bolt 192 and also slide closer to or further from frame member 134 as required during movement.

Figure 3:
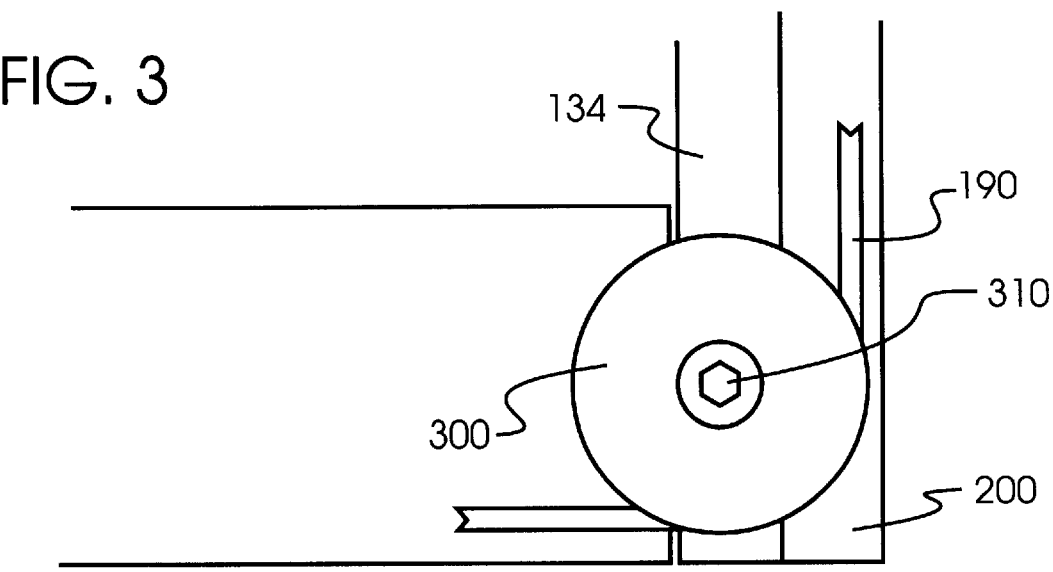
FIG. 3 illustrates a preferred platform, track, back, pulley and cable from side schematic view.
Figure 4:
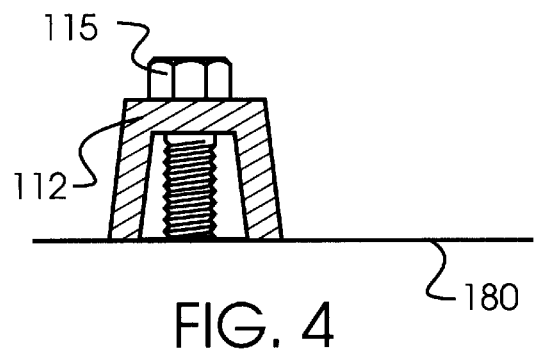
FIG. 4 illustrates a cross section of cross member 112 taken along line 4' of FIG. 1.

FIG. 3 illustrates schematically the placement of one exemplary pulley 300, which rotates about bolt 310 and nut 312 visible in FIG. 2, and cable 190 with respect to track 200, frame member 134 and platform 120. As can be seen in FIG. 3, cable 190 passes out from within platform 120 through an angle translation at pulley 300 and vertically within track 200. In FIG. 2, cable 190 is visible passing between shoe 250 and track base 210. This direction of travel means that when cable 190 is pulled into platform 120, platform 120 will be raised upward along track 200. When cable 190 is released from platform 120 into track 200, platform 120 will be lowered. Cable 190 is most preferably looped about a horizontal bolt anchored transverse through and at the top of tracks 200, 201, though other suitable methods of attachment are also contemplated herein.

Figure 5:
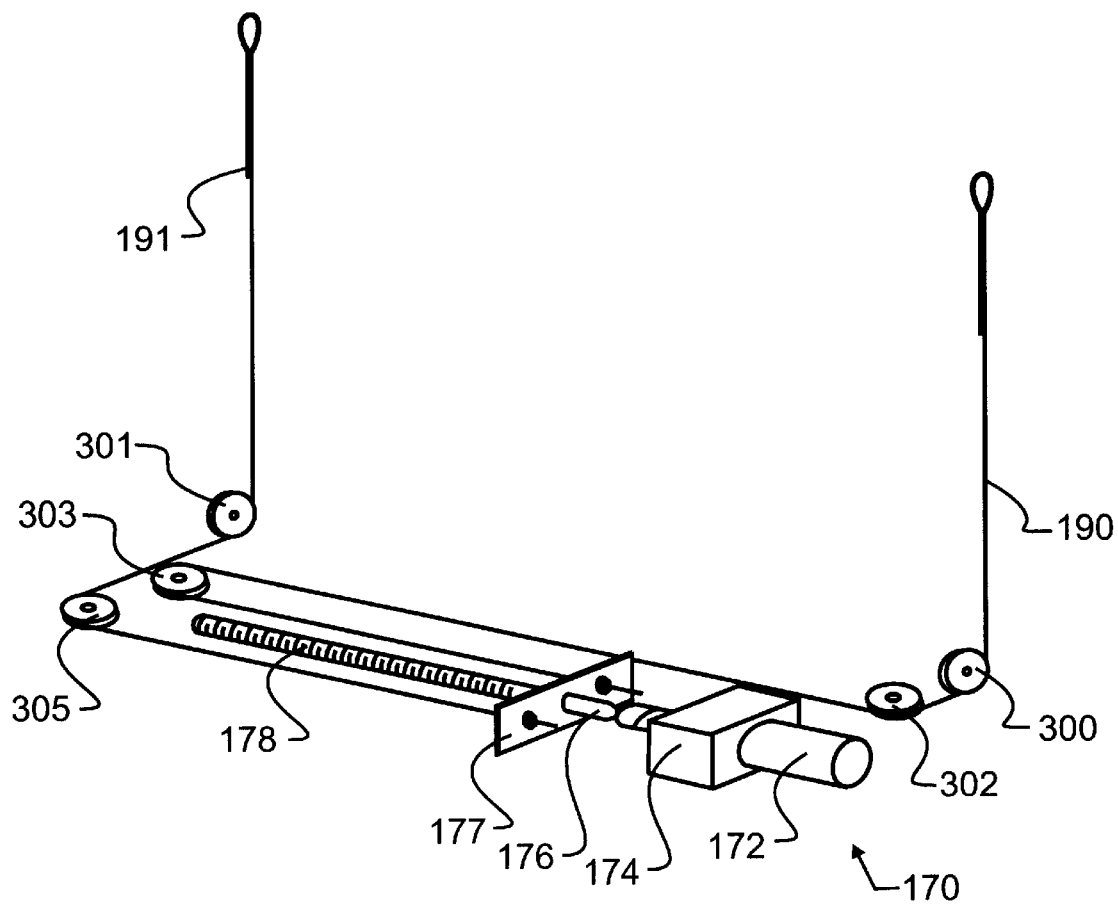
FIG. 5 illustrates the drive components by skeleton projected view, with all other lift and platform components removed for simplicity of understanding.

FIG. 5 illustrates a preferred driving apparatus 170 for moving platform 120 relative to floor 184. Driving apparatus 170 includes cables 190, 191, pulleys 300–305, electric motor 172, gear box 174, coupling 176, plate 177 and threaded rod 178, though many other techniques are known. The driving apparatus in alternative embodiments may take the form of various sources of motive power including but not limited to human sources through hand cranks and the like, electric motors, gasoline or other combustion engines, or other such sources. Transmission of this power may be similarly diverse, and might include but certainly not be limited to winches, screw drives, rack and pinion gears, hydraulic cylinders, and the like. In the preferred embodiment, electric motor 172 will rotate threaded rod 178 after being geared to an appropriate speed, if necessary, through gear box 174. Rotation of rod 178 in turn causes threaded coupling 176, which is not allowed to rotate but which is threaded onto rod 178, to move horizontally. This motion in turn either feeds out or draws in additional cable 190, 191 into platform 120. As described herein above, that feed or drawing of cable leads to motion of platform 120. In the preferred embodiment, driving apparatus 170, other than cable 190, 191, is entirely contained within platform base 121, thereby eliminating the need for any additional boxes or compartments. There may be situations where it is desired to instead locate driving apparatus 170 externally to platform 120, in which case one skilled in the art will be able to do so in view of the descriptions provided herein.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, though not limited thereto, various counterweights and force balancing springs are known in the art. The use of such techniques in conjunction with the present invention is certainly contemplated herein.

Therefore, the scope of the invention is set forth and particularly described in the claims herein below.

We claim:

1. A surface-mounted adjustable height wall unit operative for raising a load from a first position adjacent a floor to a second position spaced from said floor and lowering said load from said second position spaced from said floor to said first position adjacent said floor comprising:
   a wall mount for rigidly attaching to a wall surface;
   a base for supporting said load having a length, width and height, said base length and base width defining a base horizontal surface having a horizontal surface back edge, a horizontal surface front edge opposed and parallel to said horizontal surface back edge and first and second horizontal surface sides opposed from and parallel to each other;
   a back movably attached to said wall mount having a bottom edge, a top edge and two side edges, said base pivotally attached to said back along said base horizontal surface back edge and said back bottom edge for rotation of said base between parallel and adjacent to said horizontal plane and parallel and adjacent said back;
   a drive for moving said back and said base relative to said wall mount;
   a removable frame forming a basket with said back and said base into which said load may be placed and retained; and
   at least one panel removably attached to said removable frame adjacent said base front edge and said base first and second horizontal surface sides forming a barrier to human tampering with said load when said load is in said second position.

2. The surface-mounted adjustable height wall unit of claim 1 wherein said drive further comprises an electric motor operatively mounted within said base and at least one cable extending from said electric motor to said wall mount, said electric motor operative to selectively apply tensioning force to said cable.

3. The surface-mounted adjustable height wall unit of claim 1 wherein said wall mount further comprises a pair of extruded tracks, at least one cross member extending between said pair of extruded tracks, and means for sliding within said pair of extruded tracks and following irregularities in surface geometry and installation direction.

4. The surface-mounted adjustable height wall unit of claim 3 wherein said at least one cable extends within at least one of said pair of extruded tracks.

5. A storage lift apparatus, comprising:
   a cargo support base;
   a first support track extending vertically on and secured to a single surface of a generally planar wall extending vertically from a floor towards a ceiling;
   a second support track secured to said generally planar wall and horizontally displaced from said first support track;
   a cross-member rigidly spacing said first and second support tracks horizontally apart, said cross-member vertically adjustable relative to said first and second support tracks; and
   a means for supporting said cargo support base on said first support track and moveable with respect thereto, said supporting means having:
      a first shoe retained within said support track and further operatively moveable in a vertical direction relative to said first support track between a position adjacent said floor and a position adjacent said ceiling, said first shoe supporting said cargo support base during said movement against consequential movement of said cargo support base in a horizontal plane;
      a second shoe retained within said second support track operatively moveable relative thereto during said movement; and
      a drive operatively connected to move said first shoe relative to said first support track and thereby operatively move said cargo support base relative to said floor;
      whereby said storage lift apparatus may be loaded with cargo at a position adjacent said floor and subsequently elevated therefrom by said drive moving said first shoe relative to said first support track to make said floor level space available for alternative usage.

6. The storage lift apparatus of claim 5 wherein said first support track comprises an extrusion.

7. A storage lift apparatus, comprising:
   a cargo support base;
   a first support track extending vertically on and secured to a single surface of a generally planar wall extending vertically from a floor towards a ceiling; and
   a means for supporting said cargo support base on said first support track and moveable with respect thereto, said supporting means having:
      a first shoe retained within said support track and further operatively moveable in a vertical direction relative to said first support track between a position adjacent said floor and a position adjacent said ceiling, said first shoe supporting said cargo support base during said movement against consequential movement of said cargo support base in a horizontal plane;
      a framing member;
      a pivotal coupling between said shoe and said framing member; and
      a drive operatively connected to move said first shoe relative to said first support track and thereby operatively move said cargo support base relative to said floor;
      whereby said storage lift apparatus may be loaded with cargo at a position adjacent said floor and subsequently elevated therefrom by said drive moving said first shoe relative to said first support track to make said floor level space available for alternative usage.

8. A storage lift apparatus, comprising:
   a cargo support base;
   a first support track extending vertically on and secured to a single surface of a generally planar wall extending vertically from a floor towards a ceiling; and
   a means for supporting said cargo support base on said first support track and moveable with respect thereto, said supporting means having:
      a first shoe retained within said support track and further operatively moveable in a vertical direction relative to said first support track between a position adjacent said floor and a position adjacent said ceiling, said first shoe supporting said cargo support base during said movement against consequential movement of said cargo support base in a horizontal plane;
      a framing member;
      a hinge between said cargo support base and said framing member pivotally attaching said cargo support base to said framing member;

a drive operatively connected to move said first shoe relative to said first support track and thereby operatively move said cargo support base relative to said floor;

whereby said storage lift apparatus may be loaded with cargo at a position adjacent said floor and subsequently elevated therefrom by said drive moving said first shoe relative to said first support track to make said floor level space available for alternative usage.

9. A storage lift apparatus, comprising:

a cargo support base;

a cargo support frame extending vertically from said cargo support base;

removable enclosures that in a first position engage said cargo support frame and enclose said cargo support base and slide vertically from said first position into a second position out of engagement with said cargo support frame, said cargo support base open when said removable enclosures are in said second position;

a first support track extending vertically on and secured to a single surface of a generally planar wall extending vertically from a floor towards a ceiling; and a means for supporting said cargo support base on said first support track and moveable with respect thereto, said supporting means having:
   a first shoe retained within said support track and further operatively moveable in a vertical direction relative to said first support track between a position adjacent said floor and a position adjacent said ceiling, said first shoe supporting said cargo support base during said movement against consequential movement of said cargo support base in a horizontal plane; and
   a drive operatively connected to move said first shoe relative to said first support track and thereby operatively move said cargo support base relative to said floor;

whereby said storage lift apparatus may be loaded with cargo at a position adjacent said floor and subsequently elevated therefrom by said drive moving said first shoe relative to said first support track to make said floor level space available for alternative usage, said enclosures blocked from said vertical slide when said storage lift apparatus is in an elevated position with respect to said floor.

10. A storage lift apparatus, comprising:

a cargo support base;

a first support track extending vertically on and secured to a single surface of a generally planar wall extending vertically from a floor towards a ceiling; and a means for supporting said cargo support base on said first support track and moveable with respect thereto, said supporting means having:
   a first shoe retained within said support track and further operatively moveable in a vertical direction relative to said first support track between a position adjacent said floor and a position adjacent said ceiling, said first shoe supporting said cargo support base during said movement against consequential movement of said cargo support base in a horizontal plane; and
   a drive operatively connected to move said first shoe relative to said first support track and thereby operatively move said cargo support base relative to said floor, said drive having an electric motor mounted within said cargo support base and a power transmission passing through said first support track selected from the group comprising hydraulics, gears, cables and screw jacks;

whereby said storage lift apparatus may be loaded with cargo at a position adjacent said floor and subsequently elevated therefrom by said drive moving said first shoe relative to said first support track to make said floor level space available for alternative usage.

11. The storage lift apparatus of claim 10 further comprising a remote key switch displaced horizontally from said cargo support base for securely controlling the application of electric power to said electric motor.

12. A multi-purpose transportation, work and storage unit which selectively provides an adjustable height working surface or additional storage space, comprising in combination:
   a garage structure having a floor, a roof above said floor, and a wall forming a generally planar surface between said floor and said roof;
   a lift having first and second vertically extending tracks affixed to said wall, shoes journalled within said vertically extending tracks and slidable relative thereto in a vertical direction while prevented by interaction between said shoes and said track from consequential movement in a horizontal plane, a surface extending perpendicular from and solely supported by said shoes for supporting objects thereon, a hinge pivotally coupling said object supporting surface to said shoes, a drive for vertically displacing said supporting surface from said floor, and a means to operatively adjust an amount of said vertical displacement between said supporting surface and said floor, said supporting surface alternatively supported adjacent said floor level and above said floor.

13. The multi-purpose transportation, work and storage unit of claim 12 further comprising a removable framing member rigidly attaching said object supporting surface to said shoes, whereby said removable framing member may be removed and said object supporting surface pivoted from said perpendicular relative to said shoes to parallel thereto.

14. A multi-purpose transportation, work and storage unit which selectively provides an adjustable height working surface or additional storage space, comprising in combination:
   a garage structure having a floor, a roof above said floor, and a wall forming a generally planar surface between said floor and said roof;
   a lift having first and second vertically extending tracks affixed to said wall, shoes journalled within said vertically extending tracks and slidable relative thereto in a vertical direction while prevented by interaction between said shoes and said track from consequential movement in a horizontal plane, a surface extending perpendicular from, solely supported by, and pivotally attached to said shoes for supporting objects thereon, a drive for vertically displacing said surface from said floor, and a means to operatively adjust an amount of said vertical displacement between said surface and said floor, said surface alternatively supported adjacent said floor level and above said floor.

15. A multi-purpose transportation, work and storage unit which selectively provides an adjustable height working surface or additional storage space, comprising in combination:
   a garage structure having a floor, a roof above said floor, and a wall forming a generally planar surface between said floor and said roof;

a lift having first and second vertically extending tracks affixed to said wall, at least one cross member extending horizontally between and vertically adjustable relative to said first and second vertically extending tracks, said at least one cross member operatively rigidly attached to said first and second vertically extending tracks and to said wall, shoes journalled within said vertically extending tracks and slidable relative thereto in a vertical direction while prevented by interaction between said shoes and said track from consequential movement in a horizontal plane, a surface extending perpendicular from and solely supported by said shoes for supporting objects thereon, a drive for vertically displacing said surface from said floor, and a means to operatively adjust an amount of said vertical displacement between said surface and said floor, said surface alternatively supported adjacent said floor level and above said floor.

16. A multi-purpose transportation, work and storage unit which selectively provides an adjustable height working surface or additional storage space, comprising in combination:

a garage structure having a floor, a roof above said floor, and a wall forming a generally planar surface between said floor and said roof;

a lift having first and second vertically extending tracks affixed to said wall, shoes journalled within said vertically extending tracks and slidable relative thereto in a vertical direction while prevented by interaction between said shoes and said track from consequential movement in a horizontal plane, a surface extending perpendicular from and solely supported by said shoes for supporting objects thereon, a frame surrounding said object supporting surface and having vertically extending guides that operatively receive and retain enclosure walls through vertical motion of said enclosure walls relative to said frame, a drive for vertically displacing said surface from said floor, and a means to operatively adjust an amount of said vertical displacement between said surface and said floor, said surface alternatively supported adjacent said floor level and above said floor.

17. A multi-purpose transportation, work and storage unit which selectively provides an adjustable height working surface or additional storage space, comprising in combination:

a garage structure having a floor, a roof above said floor, and a wall forming a generally planar surface between said floor and said roof;

a lift having first and second vertically extending tracks affixed to said wall, shoes journalled within said vertically extending tracks and slidable relative thereto in a vertical direction while prevented by interaction between said shoes and said track from consequential movement in a horizontal plane, a surface extending perpendicular from and solely supported by said shoes for supporting objects thereon, a drive for vertically displacing said supporting surface from said floor having an electric motor mounted below said object supporting surface, means for transmitting motive power passing through said first support track, and a remote key switch for selectively energizing said electric motor, said supporting surface alternatively supported adjacent said floor level and above said floor.

18. A storage lift apparatus, comprising:

a cargo support base;

a first support track extending vertically on and secured to a single surface of a generally planar wall extending vertically from a floor towards a ceiling; and a means for supporting said cargo support base on said first support track and moveable with respect thereto, said supporting means having:
a first shoe retained within said support track and further operatively moveable in a vertical direction relative to said first support track between a position adjacent said floor and a position adjacent said ceiling, said first shoe supporting said cargo support base during said movement against consequential movement of said cargo support base in a horizontal plane; and
a drive operatively connected to move said first shoe relative to said first support track and thereby operatively move said cargo support base relative to said floor, said drive having a cable passing through and anchored adjacent a top of said first support track;
whereby said storage lift apparatus may be loaded with cargo at a position adjacent said floor and subsequently elevated therefrom by said drive moving said first shoe relative to said first support track to make said floor level space available for alternative usage.

19. A multi-purpose transportation, work and storage unit which selectively provides an adjustable height working surface or additional storage space, comprising in combination:

a garage structure having a floor, a roof above said floor, and a wall forming a generally planar surface between said floor and said roof;

a lift having first and second vertically extending tracks affixed to said wall, shoes journalled within said vertically extending tracks and slidable relative thereto in a vertical direction while prevented by interaction between said shoes and said track from consequential movement in a horizontal plane, a surface extending perpendicular from and solely supported by said shoes for supporting objects thereon, a drive for vertically displacing said surface from said floor having a means for transmitting motive power passing through said first support track and anchored adjacent a top thereof, said surface alternatively supported adjacent said floor level and above said floor.

* * * * *